United States Patent [19]
Kraus et al.

[11] Patent Number: 5,842,597
[45] Date of Patent: Dec. 1, 1998

[54] ENVIRONMENTALLY CONTROLLED VENDING MACHINE FOR HUMIDITY SENSITIVE PRODUCTS

[75] Inventors: Rudy Kraus, Brewster, N.Y.; Steven K. Friedman, Newton, Conn.

[73] Assignee: Cigar Vending Corp., Danbury, Conn.

[21] Appl. No.: 763,985

[22] Filed: Dec. 10, 1996

[51] Int. Cl.[6] ................................................ A24F 27/14
[52] U.S. Cl. .................................... 221/150 R; 62/176.1
[58] Field of Search ..................... 221/150 R, 150 HC, 221/135; 62/259.1, 176.1, 176.6

[56] References Cited

U.S. PATENT DOCUMENTS

| | | | |
|---|---|---|---|
| 1,766,097 | 6/1930 | Bonaventura | 221/131 |
| 2,263,374 | 11/1941 | Yates | 226/125 |
| 2,531,084 | 11/1950 | Sommer | 312/31.1 |
| 2,888,168 | 5/1959 | Gabrielsen et al. | 221/131 |
| 2,960,373 | 11/1960 | Caruso | 312/35 |
| 3,128,908 | 4/1964 | Holstein et al. | 221/105 |
| 3,172,713 | 3/1965 | Rupert | 312/235 |
| 3,406,743 | 10/1968 | Gomez | 165/12 |
| 3,500,649 | 3/1970 | Feldman | 62/3 |
| 4,334,634 | 6/1982 | Fernandez et al. | 221/131 |
| 4,920,764 | 5/1990 | Martin | 62/259.1 |
| 5,044,520 | 9/1991 | Moisan | 222/2 |
| 5,065,897 | 11/1991 | Smith | 221/130 |
| 5,345,776 | 9/1994 | Komazaki et al. | 62/176.6 |
| 5,351,856 | 10/1994 | Laidlaw | 221/131 |
| 5,428,964 | 7/1995 | Lobdell | 62/176.6 |

FOREIGN PATENT DOCUMENTS

| | | |
|---|---|---|
| 0474911 | 3/1992 | European Pat. Off. . |
| 2745104 | 8/1997 | France . |
| 29513521 | 11/1995 | Germany . |
| 2191313 | 12/1987 | United Kingdom . |
| 2258299 | 2/1993 | United Kingdom . |

OTHER PUBLICATIONS

International Search Report dated 9 Feb. 1998 (3 Pages).
Patent Abstracts of Japan, vol. 096, No. 005, 31 May 1996.
Miscellaneous page—"Examiner's Report . . . " for Application No. GB 9215951.6.
"A–Tech–10" ATS Microprocessor Based Temperature and Humidity Controller, *Air Technology Systems*, Inc., Frederick, MD, Jan. 13, 1994.

*Primary Examiner*—Kenneth Noland
*Attorney, Agent, or Firm*—Cummings & Lockwood

[57] ABSTRACT

An environmentally controlled vending machine utilizing real-time monitoring of environmental parameters and feedback control for improved storage conditions for tobacco products such as cigars and other humidity sensitive products, is disclosed. A number of environmental parameters, such as temperature and humidity, are balanced using a closed loop feedback control process in response to measured system parameters. The vending machine includes a controller, one or more remote sensors which monitor the environmental conditions within the vending machine housing, a fan, a heater strip, a cooling unit, a humidifier, and a payment and selection system. The vending machine stores and maintains tobacco products, or other humidity sensitive products, at a recommended temperature and humidity, and includes means for continuously monitoring and controlling the environment to retain the freshness and value of the respective product. In order to best maintain the freshness and value of the tobacco products, for example, the vending machine preferably stores the products at approximately 70° F. and a relative humidity of approximately 70%.

35 Claims, 4 Drawing Sheets

ENVIRONMENTALLY CONTROLLED VENDING MACHINE FOR HUMIDITY SENSITIVE PRODUCTS

FIELD OF THE INVENTION

The present invention relates to vending machines, and more particularly, to a vending machine for humidity sensitive products, such as tobacco or cosmetic products, which is capable of monitoring and adaptively controlling internal environmental parameters.

BACKGROUND OF THE INVENTION

In this age of convenience and twenty four hour access, the vending machine has become a vital resource in the retailing chain of many products. There are, of course, many types of self-service vending machines which are designed to dispense many different types of products. Initially, vending machines were not environmentally controlled and were limited to dispensing products which were not temperature sensitive. In response to the growing demand of consumers to obtain food or beverage products by means of a vending machine, a number of vending machines were developed which provided refrigeration. See, for example, U.S. Pat. No. 4,920,764 and the patents discussed therein.

While such conventional vending machines have been successfully utilized to distribute many types of temperature sensitive products, current machines are not suitable for distributing humidity sensitive products, such as cosmetics or high quality tobacco products, which must be stored and maintained at a recommended temperature and humidity to retain the freshness and value of the respective product. Thus, to date, consumers have been unable to obtain such humidity sensitive products from a remotely placed vending machine.

As is apparent from the above discussion, a need exists for a vending machine which is capable of storing humidity sensitive products at a recommended temperature and humidity in order to retain the freshness and value of the product. A further need exists for a vending machine capable of continuously monitoring and adaptively controlling the storage environment to maintain desired temperature and humidity settings. Yet another need exists for a vending machine humidor which may be located at remote locations, to allow a user the convenience of obtaining a desired tobacco product by inserting either a credit card or paper currency into the vending machine and receiving a selection of one or more desired tobacco products.

SUMMARY OF THE INVENTION

Generally, according to aspects of the present invention, an environmentally controlled vending machine is disclosed which stores and maintains humidity sensitive products, such as tobacco or cosmetic products, at a recommended temperature and humidity. In accordance with another aspect of the invention, the internal environment of the vending machine is continuously monitored and adjusted to control the environment as necessary to retain the freshness and value of the respective products. A number of environmental parameters, such as temperature and humidity, are balanced using a closed loop feedback control process in response to measured system parameters.

The disclosed vending machine includes a controller, one or more remote sensors, which monitor the environmental conditions within the vending machine housing, a fan, a heater strip, a cooling unit, a humidifier, and a payment and selection system. In order to best maintain the freshness and value of the tobacco products, for example, the vending machine preferably stores the products at approximately 70° F. and a relative humidity of approximately 70%.

The controller is preferably embodied as a temperature and humidity controller or microprocessor. According to features of the present invention, the controller monitors a number of environmental parameters in real time and provides feedback control by means of an adaptive control loop to achieve desired environmental settings. The controller controls heating, humidification, fan circulation and cooling, if required, in response to environmental measurements made in real time by the remote sensors, such as a thermostat and a humidistat.

To balance the controlling environmental variables, the controller preferably utilizes two controller loops: a temperature control loop and a humidity control loop. In one preferred embodiment, each controller loop is embodied as a proportional-integral-derivative (PID) loop controller object which can preferably be run in a manual, programmed or automatic mode as desired. Preferably, the temperature control loop and the humidity control loop are run in the automatic mode to maintain the temperature and humidity, respectively, to desired values. In this manner, the environmental values may be held nearly constant.

A more complete understanding of the present invention, as well as further features and advantages of the invention, will be obtained by reference to the detailed description and drawings.

DETAILED DESCRIPTION

Figure 1:
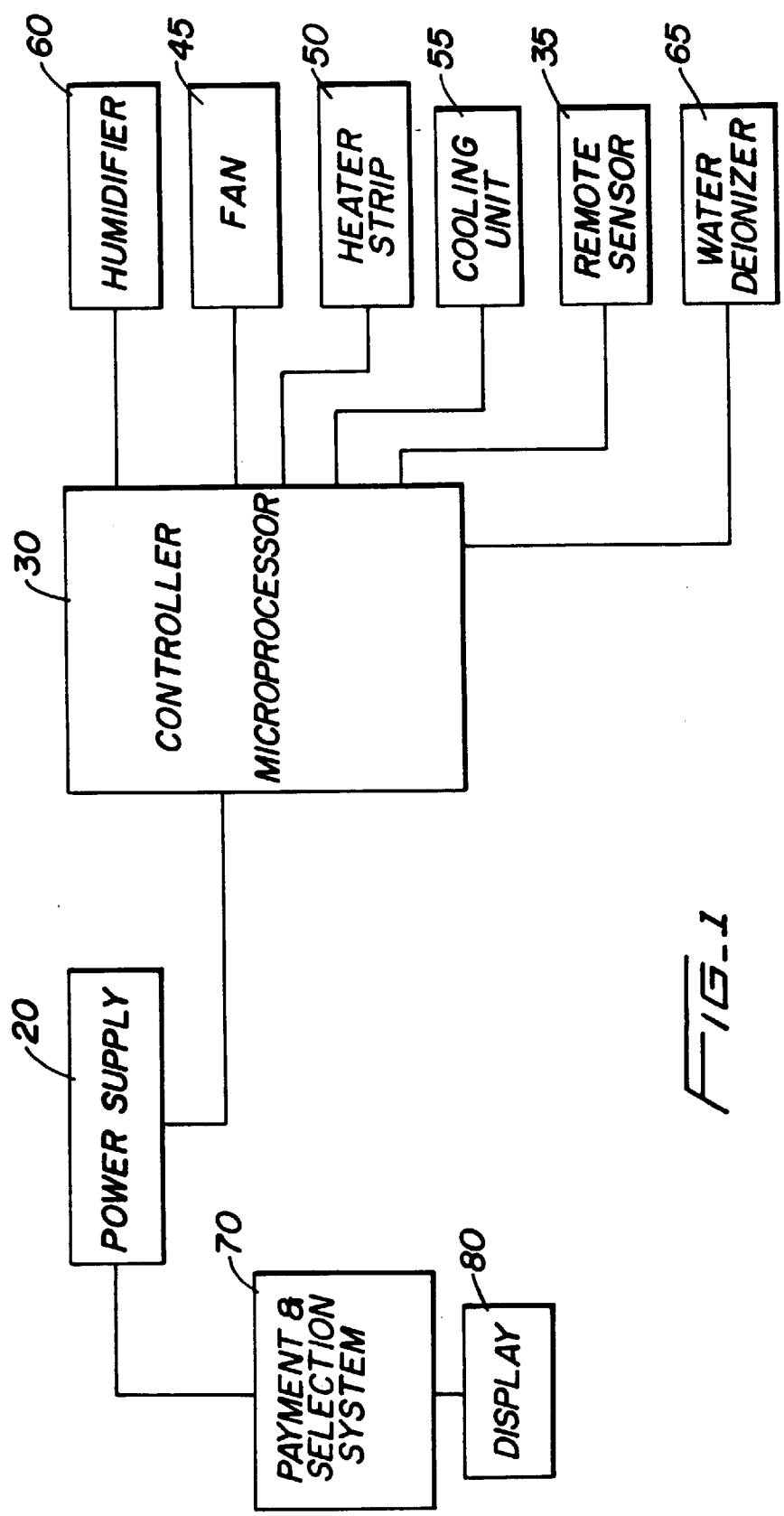
FIG. 1 is a schematic block diagram illustrating a vending machine incorporating features of the present invention.

As shown in FIG. 1, an environmentally controlled vending machine 10 according to the present invention includes an outer housing 15, a power supply system 20, a controller 30, one or more remote sensors 35 which monitor the environmental conditions within the housing 15, a fan 45, a heater strip 50, a cooling unit 55, a humidifier 60, a water deionizer 65, a payment and selection system 70, and one or more displays 80. In a preferred embodiment, the vending machine 10 may be embodied as a conventional spiral type vending machine, such as model number 3039, manufactured by FSI, of Des Moines, Iowa, as modified herein to provide environmental controls and enhanced payment capabilities. According to features of the present invention, the vending machine 10 is designed to store and maintain humidity sensitive products, such as tobacco or cosmetic products, at a recommended temperature and humidity, and continuously monitors and controls the environment to retain the freshness and value of the product.

PRODUCT PAYMENT AND SELECTION

Figure 2:
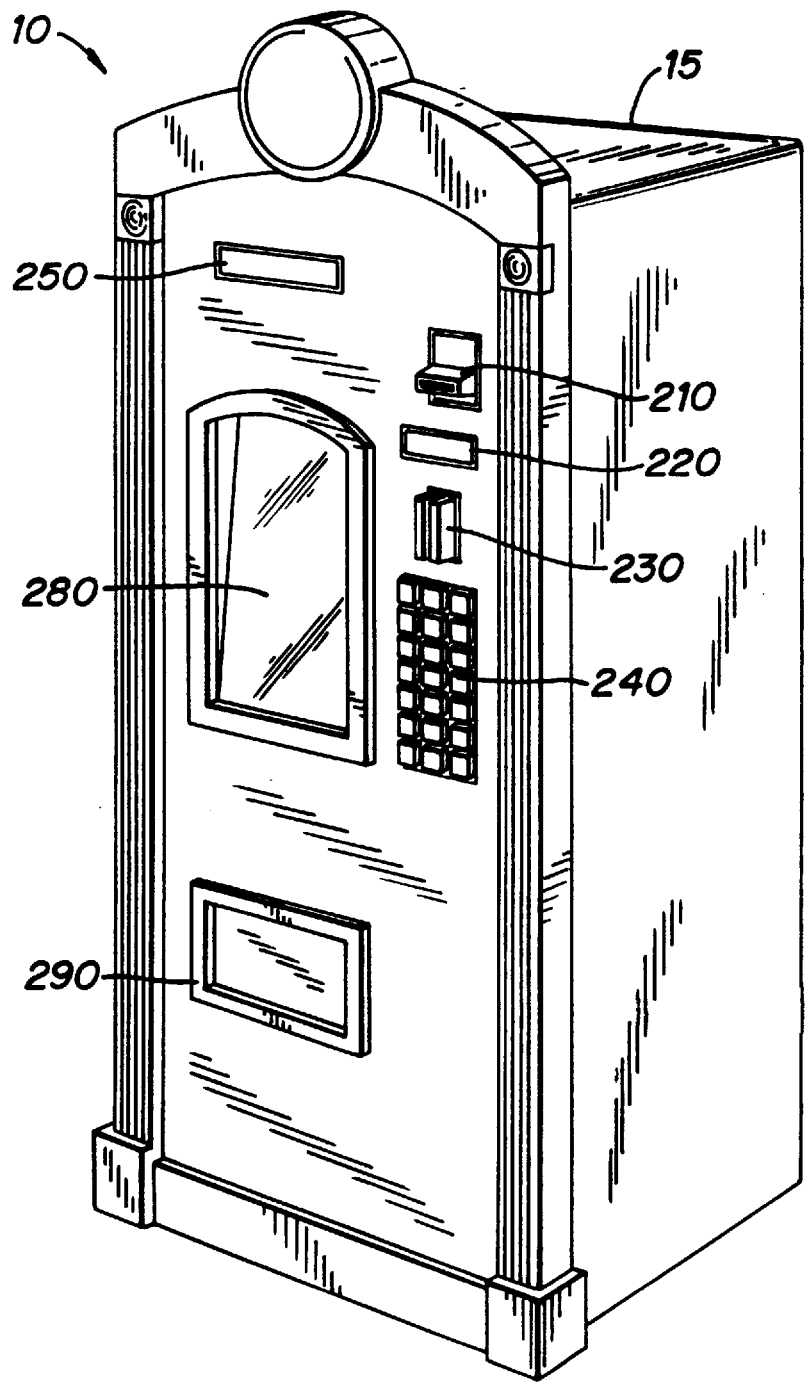
FIG. 2 is a diagram illustrating a perspective view of one embodiment of the vending machine of FIG. 1.

In a preferred embodiment, shown in FIG. 2, the payment and selection system 60 includes a currency exchange unit 210, a currency and selection display 220, a credit card validator 230, and a control panel keypad 240. The currency exchange unit 210 may be embodied as a bill and/or coin mechanism. In the illustrative embodiment, the currency exchange unit 210 may be embodied as the Coinco Model BA30 bill acceptor, manufactured by Coinco Inc. of St. Louis, Mo., which accepts bills and does not make change. For a more detailed discussion of a suitable currency exchange unit 210, see U.S. Pat. No. 5,310,173, incorporated by reference herein.

The credit card validator 230 may be embodied as the Veritone (Tranz) Model 330, manufactured by Veritone Corp. of California, and includes a credit card swipe mechanism and a modem (not shown). Once a credit card is accepted and validated, a pulse will be generated by the credit card validator 230 to the currency exchange unit 210 in the proper amount to allow the appropriate product to be dispensed, in a known manner. Once the user has paid for the desired product, the user can indicate the selection by means of the control panel keypad 240.

In one implementation, the outer housing 15 includes an LCD display 250, which may be utilized to present a user with information on the products dispensed through the vending machine 10, as well as the LCD display 220 for presenting a user with information on payment and selection. Alternatively, an LED display may be utilized, or some other illuminated or graphical display system. In addition, the outer housing 15 may include one or more displays (not shown), such as analog dials, for presenting the user with environmental information, such as current temperature and humidity readings.

As shown in FIG. 2, outer housing 15 also preferably incorporates a product viewing window 280 and a dispensing tray 290. The power supply system 20 is preferably a low voltage DC power supply, supplying voltage on the order of 115 volts AC, and supplying current on the order of 5 amps.

ENVIRONMENTAL CONTROLS

The controller 30 is preferably embodied as a temperature and humidity controller or microprocessor, such as the A-Tech-10 microprocessor, manufactured by Air Technology Systems, Inc. According to features of the present invention, discussed further below in conjunction with FIGS. 3 and 4, the controller 30 monitors a number of environmental parameters in real time and provides feedback control by means of an adaptive control loop to achieve desired environmental settings. The controller 30 controls heating, humidification, fan circulation and cooling if required, in response to environmental measurements made in real time by the sensors 35, such as a thermostat and a humidistat. Preferably, the controller 30 will not simultaneously activate heating and cooling functions. The controller 30, however, allows humidification in either a heating or a cooling mode. Prior to activating either the heating or cooling functions, in the manner described below, the controller 30 first enables the fan switch for a predefined period.

It has been found that cigars will best maintain their freshness when stored at a temperature of approximately 70° F., and a relative humidity of approximately 70% (RH), in accordance with manufacturer recommended temperature and humidity conditions. The particular environmental settings are selected to maintain the freshness and value of the tobacco product, as would be apparent to a person of ordinary skill.

In order to maintain the vending machine 10 at a desired humidity level, a humidifier 60, such as an ultrasonic humidifier, is preferably provided. If the humidity readings measured by the humidistat sensor 35 deviate significantly from desired levels, the humidifier 60 receives an enable signal from the controller 30. The water supply utilized by the humidifier 60 is preferably deionized water in order to prevent any contaminants from being deposited into the vending machine 10.

The humidifier 60 may be embodied as a Stulz FN 400 H ultrasonic humidifier, manufactured by Stulz America of Frederick, Md., which utilizes an ultrasonic transducer to produce a mechanical oscillation under a cavity, or well, of water. The mechanical oscillation causes the water particles to vibrate at high speed (cavitation) to produce high energy vapor which is absorbed into the air stream. Upon absorption, heat is extracted out of the air by a process known as the latent heat of vaporization and results in cooling as well as humidification. It has been found that the air parameter requirements for proper absorption is approximately 200 ft/min.

As previously indicated, the ultrasonic humidifier preferably utilizes deionized water. Thus, in order to have a reliable supply of deionized water, the vending machine 10 preferably incorporates a water deionizer 65 to remove ionizable solids from the water, using principles of ion exchange. Minerals dissolved in water are composed of a positively charged metallic part (cation) and a negatively charged non-metallic part (anion). Since both anions and cations must be exchanged, and no single resin could exchange both, the water deionizer 65 preferably contains two resins. Thus, a cation exchange resin is utilized to attract positive ions and an anion exchange resin is utilized to attract negative anions, in a known manner. As the water passes through the water deionizer 65, an exchange occurs when a positive ion contacts a negative exchange site, and when a negative ion contacts a positive exchange site. The water purity improves with each exchange as more ions are removed.

In a preferred implementation, the water deionizer 25 is embodied as a mixed bed deionizer cartridge filter. The cartridge filter must be recharged when the positive and negative ionic exchange resins become exhausted. Thus, in a preferred embodiment, the output of the water deionizer 25 is monitored by a water quality monitor (not shown) which preferably evaluates the water quality based upon water conductivity and provides an alarm function. The water quality monitor is preferably embodied as a light transformer and an alarm light probe (not shown), such as a neon lamp. In operation, the neon lamp will provide an alarm to an operator when the measured conductivity value rises above a predefined threshold, indicating that the cartridge filter must be replaced.

In order to maintain the vending machine 10 at a desired temperature, the vending machine 10 preferably incorporates a heater strip 50 and a cooling unit 55. It is noted that if the vending machine 10 is positioned in an environment having a suitable temperature, the heater strip 50 or the cooling unit 55 may be unnecessary. Thus, if the temperature readings measured by the thermostat sensor 35 deviate significantly from desired levels, the controller 30 preferably enables either the heater strip 50 or the cooling unit 55, as appropriate. The heater strip 50 is preferably a 500 watt, 120 volt resistance strip heater which can be installed into the circulatory air duct. The cooling unit 55 is preferably a DX type split system, comprised of a condenser, a compressor and a cooling coil. The condenser is preferably positioned outside of the vending machine 10, with the compressor located on the inside of the vending machine 10 and the cooling coil positioned in the air recirculation duct.

To facilitate freshness, the air inside the vending machine 10 is preferably circulated at approximately 50–200 ft/min by the circulation fan 45. The circulation allows for proper absorption, dissipation and necessary product environmental contact to sustain product freshness.

MONITORING AND FEEDBACK CONTROL PROCESSES

Figure 3:
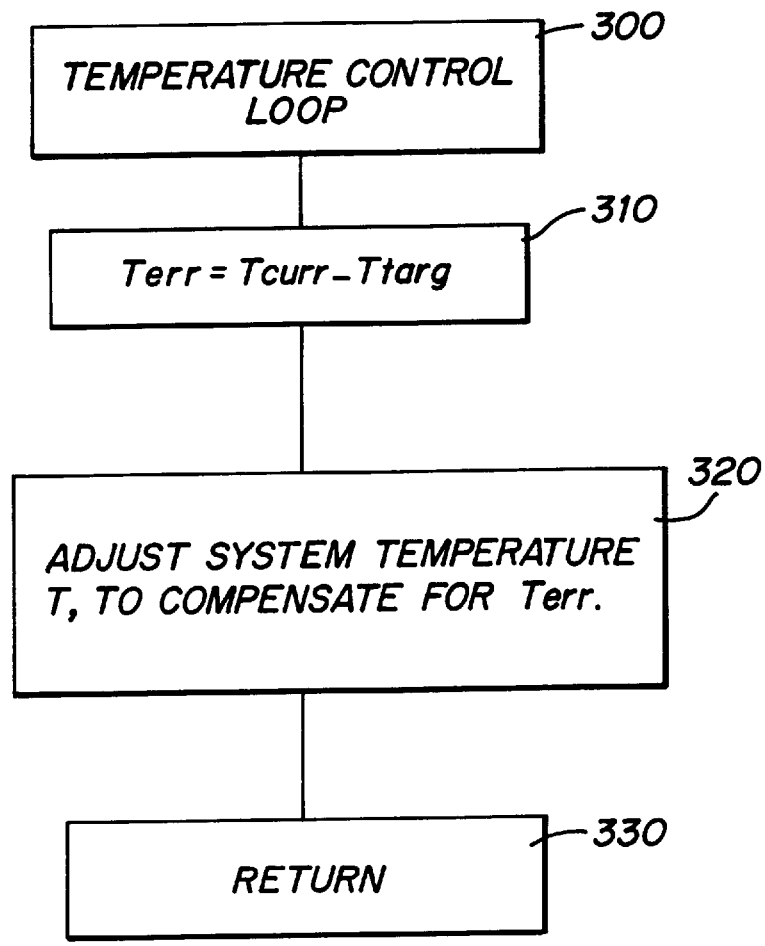
FIG. 3 is a flow chart describing an exemplary temperature control loop as utilized by the controller of FIG. 1 to adjust the temperature of the vending machine shown in FIGS. 1 and 2.
Figure 4:
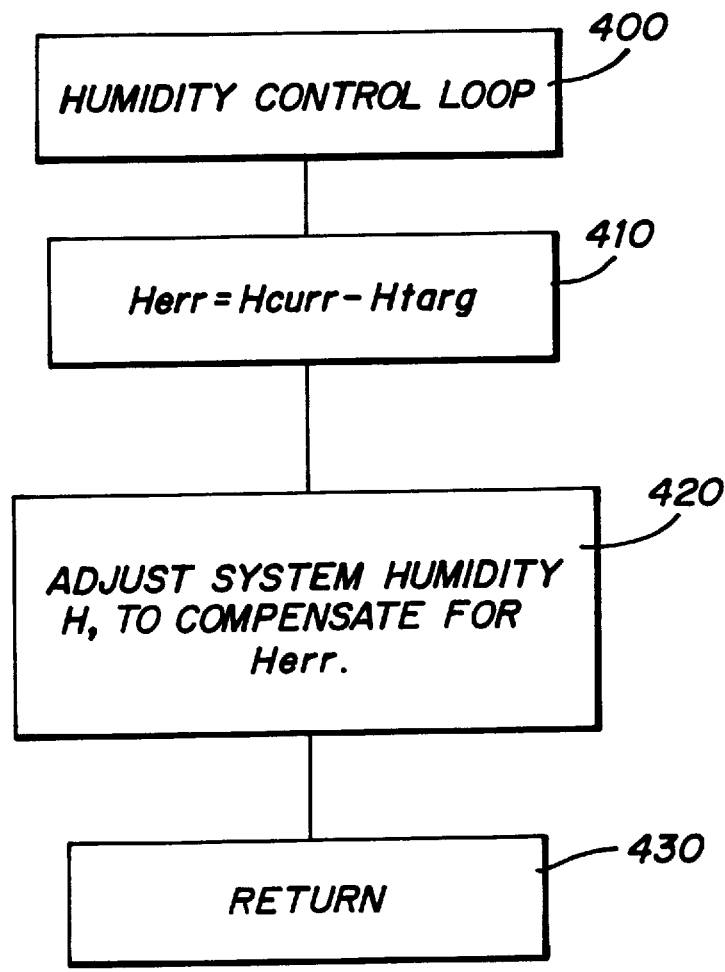
FIG. 4 is a flow chart describing an exemplary humidity control loop as utilized by the controller of FIG. 1 to adjust the humidity of the vending machine shown in FIGS. 1 and 2.

To balance the controlling environmental variables, the controller 30 preferably utilizes two controller loops: a temperature control loop 300 (FIG. 3) and a humidity control loop 400 (FIG. 4). In one preferred embodiment, each controller loop is embodied as a proportional-integral-derivative (PID) loop controller object which can preferably be run in a manual, programmed or automatic mode as desired. Manual mode is an open loop controller which requires the operator to adjust the system parameters manually. Programmed mode is an open loop controller with the controller 30 supplying the system parameter changes. Finally, automatic mode is a closed loop controller with feedback based on a measured reference parameter. In the illustrative embodiment described herein, the temperature control loop 300 and the humidity control loop 400 are run in the automatic mode to maintain the temperature and humidity, respectively, to desired values. In this manner, the environmental values may be held nearly constant.

As previously indicated, the controller 30 preferably utilizes a temperature control loop 300, illustrated in FIG. 3, to control the system temperature, T, in a closed loop feedback mode in response to temperature values measured in real time. Thus, the temperature control loop 300 receives the current temperature value, $T_{curr}$, as measured by the thermostat sensor 35, as well as the target temperature value, $T_{targ}$. The temperature error, Terr, between the current temperature value, $T_{curr}$, and the target temperature value, $T_{targ}$, is calculated during step 310 and the system temperature, T, is adjusted during step 320 to compensate for the calculated temperature error, Terr. The temperature can be varied by sending a control signal to the heater strip 50 or cooling unit 55, as appropriate.

As previously indicated, the controller 30 preferably utilizes a humidity control loop 400, illustrated in FIG. 4, to control the system humidity, H, in a closed loop feedback mode in response to humidity values measured in real time. Thus, the humidity control loop 400 receives the current humidity value, $H_{curr}$, as measured by the humidistat sensor 35, as well as the target humidity value, $H_{targ}$. The humidity error, Herr, between the current humidity value, $H_{curr}$, and the target humidity value, $H_{targ}$, is calculated during step 410 and the system humidity, H, is adjusted during step 420 to compensate for the calculated humidity error, Herr. The humidity can be varied by sending a control signal to humidifier 40.

It is to be understood that the embodiments and variations shown and described herein are illustrative of the principles of this invention only and that various modifications may be implemented by those skilled in the art without departing from the scope and spirit of the invention.

We claim:

1. An environmentally controlled vending machine for selectively dispensing humidity sensitive products, comprising:

a housing;

a holding mechanism within said housing for storing products in a manner for selective dispensement;

a selection mechanism operatively associated with said holding mechanism configured to facilitate the dispensing from said holding mechanism of a selected product;

a sensor for monitoring humidity and at least one environmental parameter within said housing;

a microprocessor in communication with said sensor for obtaining a differential value approximately equal to a difference between said monitored at least one environmental parameter and a target value defined for said at least one environmental parameter; and means in communication with said microprocessor for adjusting said at least one environmental parameter to minimize said differential value.

2. The vending machine according to claim 1, wherein said humidity sensitive products include tobacco products.

3. The vending machine according to claim 1, wherein said humidity sensitive products include cigar products.

4. The vending machine according to claim 1, wherein said humidity sensitive products include cosmetic products.

5. The vending machine according to claim 1, wherein said monitored at least one environmental parameter includes temperature.

6. The vending machine according to claim 1, wherein said humidity is maintained by an ultrasonic humidifier.

7. The vending machine according to claim 1, wherein said humidity has a target value associated therewith and wherein said target value for humidity is approximately 70% (RH).

8. The vending machine according to claim 1, wherein said at least one environmental parameter is temperature and wherein said target value for temperature is approximately 70° F.

9. The vending machine according to claim 1, wherein said at least one environmental parameter is temperature, wherein said humidity has a target value associated therewith, and wherein said microprocessor maintains the temperature and the humidity to respective target values.

10. The vending machine according to claim 1, wherein said environmental parameter is temperature and wherein said microprocessor maintains the temperature and the humidity to values appropriate for said humidity sensitive products.

11. The vending machine according to claim 6, further comprising a deionizer to supply said ultrasonic humidifier with deionized water.

12. The vending machine according to claim 11, further comprising means for automatically detecting when said deionizer requires replacement.

13. An environmentally controlled vending machine for selectively dispensing humidity sensitive products, comprising:

a housing;

a holding mechanism disposed within said housing for storing products in a manner for selective dispensement;

a button operatively connected to said holding mechanism for enabling the dispensing from said holding mechanism of a selected product; and a microprocessor for monitoring and adaptively controlling environmental conditions within said housing to maintain a target temperature and a target humidity.

14. The vending machine according to claim 13, wherein said humidity sensitive products include tobacco products.

15. The vending machine according to claim 13, wherein said humidity sensitive products include cigar products.

16. The vending machine according to claim 13, wherein said humidity sensitive products include cosmetic products.

17. The vending machine according to claim 13, wherein said target humidity is maintained by an ultrasonic humidifier.

18. The vending machine according to claim 13, wherein said target humidity is approximately 70% (RH).

19. The vending machine according to claim 13, wherein said target temperature is approximately 70° F.

20. The vending machine according to claim 13, wherein said microprocessor maintains the target temperature and the target humidity to values appropriate for said humidity sensitive products.

21. The vending machine according to claim 17, further comprising a deionizer to supply said ultrasonic humidifier with deionized water.

22. The vending machine according to claim 21, further comprising a sensor for automatically detecting when said deionizer requires replacement.

23. A method of controlling an environment within a vending machine for dispensing humidity sensitive products, comprising the steps of:
   storing said humidity sensitive products in a holding mechanism;
   enabling the dispensing from said holding mechanism of a selected product;
   monitoring humidity and at least one environmental parameter in said vending machine;
   with a microprocessor, evaluating a first difference between said monitored at least one environmental parameter and a target value defined for said at least one environmental parameter and evaluating a second difference between the monitored humidity and a target value defined for the humidity; and
   adjusting said at least one environmental parameter and the humidity to minimize said first difference and said second difference.

24. The method according to claim 23, wherein said at least one environmental parameter is temperature.

25. The method according to claim 23, further comprising the step of maintaining said humidity by means of an ultrasonic humidifier.

26. The method according to claim 23, wherein said target value for humidity is approximately 70% (RH).

27. The method according to claim 23, wherein said at least one environmental parameter is temperature and wherein said target value for temperature is approximately 70° F.

28. The method according to claim 23, wherein said at least one environmental parameter is temperature, and wherein the method further comprises the step of maintaining the temperature and the humidity to values appropriate for said humidity sensitive products.

29. The method according to claim 25, further comprising the step of deionizing water and supply the deionized water to said ultrasonic humidifier.

30. An environmentally controlled vending machine for dispensing humidity sensitive products comprising:
   a housing;
   a holding mechanism within said housing for storing products in a manner for selective dispensement;
   a selection mechanism operatively associated with said holding mechanism configured to facilitate the dispensing from said holding mechanism of a selected product;
   a sensor for monitoring humidity and at least one environmental parameter within said housing;
   processing means in communication with said sensor for obtaining a differential value approximately equal to a difference between said monitored at least one environmental parameter and a target value defined for said at least one environmental parameter;
   means in communication with said processing means for adjusting said at least one environmental parameter to minimize said differential value;
   an ultrasonic humidifier in communication with said processing means for maintaining said humidity; and
   a deionizer to supply said ultrasonic humidifier with deionized water.

31. The vending machine according to claim 30, further comprising means for automatically detecting when said deionizer requires replacement.

32. An environmentally controlled vending machine for dispensing humidity sensitive products comprising:
   a housing;
   a holding mechanism disposed within said housing for storing products in a manner for selective dispensement;
   a button operatively connected to said holding mechanism for enabling the dispensing from said holding mechanism of a selected product;
   means for monitoring and adaptively controlling environmental conditions within said housing to maintain a target temperature and a target humidity;
   an ultrasonic humidifier in communication with said means for monitoring and adaptively controlling environmental conditions for maintaining said target humidity; and
   a deionizer to supply said ultrasonic humidifier with deionized water.

33. The vending machine according to claim 32, further comprising means for automatically detecting when said deionizer requires replacement.

34. A method of controlling an environment within a vending machine for dispensing humidity sensitive products, comprising the steps of:
   storing said humidity sensitive products in a holding mechanism;
   enabling a dispensing from said holding mechanism of a selected product;
   monitoring humidity and at least one environmental parameter in said vending machine;
   evaluating a difference between said at least one environmental parameter and the humidity using a target value defined for each said at least one environmental parameter and the humidity;
   adjusting said at least one environmental parameter and the humidity to minimize said difference, wherein the humidity is adjusted using a humidifier; and
   deionizing water and supplying said water to said humidifier.

35. The method according to claim 34, wherein said at least one environmental parameter is temperature.

* * * * *